United States Patent [19]
Kondo et al.

[11] Patent Number: 6,021,455
[45] Date of Patent: Feb. 1, 2000

[54] METHOD AND SYSTEM FOR ARBITRATING A BUS ACCORDING TO THE STATUS OF A BUFFER AND DESTINATION INFORMATION

[75] Inventors: Nobukazu Kondo; Koichi Okazawa, both of Ebina; Yukihiro Seki; Ryuichi Hattori, both of Yokohama; Masaya Umemura, Fujisawa; Shigemi Adachi, Seto; Kouichi Nakai; Takashi Moriyama, both of Owariasahi, all of Japan

[73] Assignee: Hitachi, Ltd., Tokyo, Japan

[21] Appl. No.: 08/708,324

[22] Filed: Sep. 5, 1996

[30] Foreign Application Priority Data

Sep. 5, 1995 [JP] Japan .................................. 7-228231

[51] Int. Cl.[7] .................................................. G06F 13/00
[52] U.S. Cl. .......................................... 710/241; 710/113
[58] Field of Search ................................. 395/293–298, 395/856–865, 728–732, 306–309; 710/240–244, 113–118, 36–45

[56] References Cited

U.S. PATENT DOCUMENTS

| | | | |
|---|---|---|---|
| 4,698,753 | 10/1987 | Hubbins et al. | 395/200.39 |
| 5,239,651 | 8/1993 | Sodos | 395/729 |
| 5,301,279 | 4/1994 | Riley et al. | 395/861 |
| 5,313,641 | 5/1994 | Simcoe et al. | 395/730 |
| 5,388,245 | 2/1995 | Wong | 711/118 |
| 5,448,701 | 9/1995 | Metz, Jr. et al. | 395/293 |
| 5,524,235 | 6/1996 | Larson et al. | 711/151 |
| 5,546,543 | 8/1996 | Yang et al. | 395/200.65 |
| 5,546,546 | 8/1996 | Bell et al. | 395/292 |
| 5,581,709 | 12/1996 | Ito et al. | 395/858 |
| 5,630,077 | 5/1997 | Krein et al. | 395/293 |
| 5,771,359 | 6/1998 | Galloway et al. | 395/308 |
| 5,796,961 | 8/1998 | O'Brien | 395/287 |

FOREIGN PATENT DOCUMENTS 5-324544  12/1993  Japan .

*Primary Examiner*—Glenn A. Auve
*Assistant Examiner*—Rupal D. Dharia
*Attorney, Agent, or Firm*—Antonelli, Terry, Stout & Kraus, LLP

[57] ABSTRACT

An information processing system includes a first bus, a second bus, a plurality of modules connected to both buses, a bus arbiter for arbitrating a bus access request of a bus master, and a storage means for storing access data up to a predetermined amount for one of modules when access destination information indicates that said module is the access destination. Each bus master outputs access destination information and when the bus arbiter judges that one of the bus masters issues a bus access request when it performs an access operation, the bus arbiter refers to whether the predetermined amount of access destination information is fully stored in the storage means, and decides whether or not to give a bus access to the bus master.

6 Claims, 12 Drawing Sheets

FIG. 11

| BUS RIGHT REQUEST FROM OTHER MODULES | | | KIND OF BUS RIGHT REQUEST FROM THE SELF MODULE | |
|---|---|---|---|---|
| | | | MEMORY ACCESS (LEFT SIDE) | I/O ACCESS (RIGHT SIDE) |
| THERE IS A REQUEST FROM A HIGH PRIORITY MODULE | MEMORY ACCESS REQUEST | BUFFER FULL | X | X |
| | | BUFFER OK | X | X |
| | I/O ACCESS REQUEST | BUFFER FULL | O | X |
| | | BUFFER OK | X | X |
| | MEMORY ACCESS REQUEST AND I/O ACCESS REQUEST | BUFFER FULL | X | X |
| | | BUFFER OK | X | X |
| THERE IS A REQUEST ONLY FROM A LOW PRIORITY MODULE | MEMORY ACCESS REQUEST | BUFFER FULL | O | X |
| | | BUFFER OK | O | O |
| | I/O ACCESS REQUEST | BUFFER FULL | O | X |
| | | BUFFER OK | O | O |
| | MEMORY ACCESS REQUEST AND I/O ACCESS REQUEST | BUFFER FULL | O | X |
| | | BUFFER OK | O | O |
| NONE | | BUFFER FULL | O | X |
| | | BUFFER OK | O | O |

O : BUS RIGHT GRANTED, X : BUS RIGHT NOT GRANTED

METHOD AND SYSTEM FOR ARBITRATING A BUS ACCORDING TO THE STATUS OF A BUFFER AND DESTINATION INFORMATION

BACKGROUND OF THE INVENTION

The present invention relates to a bus arbitration means mounted in various information processors such as a personal computer and work station and more particularly to a means for performing suitable arbitration by improving the bus access efficiency when accesses to an I/O device and a storage compete each other.

As a bus installed in various conventional information processors which is a high-speed system bus in view of multi-processor control, for example, the so-called "Future bus+" described in "IEEE Draft Standard P896. 1R/D8.5: Future bus+ Logical Layer Specifications, IEEE Computer Society Press (1991) PP 63–104" has been proposed.

With respect to a high-speed information processor such as a server comprising a personal computer or work station, there are many processors having a structure using a high-speed system bus represented by such Future bus+. To such a system bus, a plurality of modules, for example, a plurality of processors, a processor interface, a main storage, an I/O device, and others are connected. With respect to an I/O device, a constitution that the I/O device is connected to a system bus via a converter for performing protocol conversion of information on the system bus to information on an I/O bus and the I/O bus is often proposed.

Recently, however, in the field of information processors, as the system clock frequency to be supplied to a processor increases suddenly, it is becoming one of the greatest factors for deciding the system performance whether the data access speed to a processor and main storage can be increased in correspondence with high performance of the processor.

In such a system, a constitution that a bus for connecting a processor and main storage and an I/O bus for connecting an I/O device are individually installed via a bus converter (bus adapter), that is, the so-called hierarchy of buses has advanced in view of compatibility with an existing I/O device, multi-line connection, and connection to various I/O devices.

Therefore, it is important to develop a bus control means for performing various conversion processes between buses efficiently. Furthermore, an art of bus control for realizing a higher throughput is, for example, disclosed in Japanese Laid-Open Patent Application Number 5-324544. In these buses, to realize a high throughput, use of a method that a buffer for transaction reception is provided beforehand in the module on the bus slave (hereinafter referred to as just "slave" properly) side without performing handshaking in each cycle and data is continuously written into the buffer installed in the slave on the receiving side after the bus master obtains a bus access right has been proposed.

SUMMARY OF THE INVENTION

Conventionally on a system bus provided in various information processors, "memory access" of accessing to a main storage by a processor, "PIO access" of accessing to an I/O device by a processor, and "inter-processor communication" for controlling so as to match cache storage contents are mainly executed frequently.

On the other hand, access to an I/O device is executed at a comparatively low speed, so that a method that a dedicated I/O bus is installed and the I/O bus is hierarchically connected via a bus converter is generally used. In this case, the I/O bus operates generally at a speed lower than that of the system bus to which the processor and main storage are connected, so that there is a problem imposed that the access to the main storage by the processor and the inter-processor communication are made wait by the PIO access and the bus access efficiency reduces.

The following may be considered as a reason for it.

When PIO access is continuously generated from a certain processor or a plurality of processors, an I/O bus connected via a bus converter operates generally at a low speed, so that there is a possibility that the next PIO access is generated from the processor side before the process for access data of the PIO access collected in a buffer (PIO buffer) installed in the bus converter ends. However, if there is no empty area in the PIO buffer, the buffer cannot receive access data for the next PIO access request.

In this case, if the bus system is not structured so that a retry protocol, that is, "since PIO access cannot be received, a request of retry" is issued from the slave side to the master side and further "a transfer instruction which is an object of retry request is executed again after a predetermined time" by the master side, the access request will be lost.

It also can be considered to deal with it by executing control of granting no bus access to a module other than the bus converter by the bus arbiter until an empty area is generated in the PIO buffer. In this case, however, a problem arises that even if access to the main storage and inter-processor communication are requested from a processor other than the processor issuing the PIO access request, they cannot be executed.

Even if the retry protocol is supported by the system bus, many unacceptable retry transfers are generated, so that a problem inevitably arises that the bus access efficiency reduces.

As a background of occurrence of such problems, existence of a need for making a multi-processor system cheaper may be cited. Namely, although the multi-processor system is used conventionally in the field of main frames, in an I/O system, a channel connected in a one-to-one correspondence is used instead of a bus.

Recently, however, particularly in the field of personal computers, since many buses sharing one transmission line on a time-shared basis are used so as to reduce the price, such a problem is caused.

In view of the above problems, an object of the present invention is to provide an information processing system comprising a bus connecting a processor and a bus connecting an I/O device hierarchically, wherein the bus access efficiency is improved by preventing execution of main storage access and inter-processor information transfer from entering a standby state due to PIO access which is a low-speed process.

More concretely, an object of the present invention is to provide a system for performing arbitration suitably by improving the bus access efficiency, a bus arbiter used for it, and an arbitration method when accesses to an I/O device and a storage compete each other.

To solve the above problems and accomplish the object of the present invention, the present invention has the following constitution.

Namely, the system is a system comprising a first bus, a second bus operating by a communication protocol different from that of the first bus, a plurality of modules connected to the first and second buses, a bus conversion means for performing at least protocol conversion of information between the two buses, a bus arbiter for arbitrating a bus access request issued by a bus master, and when the access destination of the bus master is a predetermined module, a storage means for storing data specifying the access up to a predetermined amount, wherein among a plurality of modules connected to the first bus, at least two modules are bus masters having a function for outputting access destination information.

The system is an information processing system wherein when the aforementioned bus arbiter judges that one of the bus masters issues a bus access request when it performs an access operation, the bus arbiter refers to the access destination information and the data storage status of the storage means and decides whether or not to grant a bus access to the bus master.

More concretely, the system is a system wherein .when a predetermined amount of information is stored in the storage area of the storage means, the bus arbiter refers to the access destination information outputted by the bus master issuing the bus access request and when the bus arbiter judges that the access destination is not the predetermined module where the storage means stores data, the bus arbiter grants a bus access right to the bus master of the highest priority order issuing the bus access request and when the bus arbiter judges that the access destination is the predetermined module where the storage means stores data, the bus arbiter grants a bus access right to the bus master of the highest priority order issuing the bus access request except the bus master outputting the access information.

As a more concrete embodiment, there is a means described below.

Namely, the modules connected to the first bus contain at least one processor, a processor interface for at least two processors, and a memory interface connected to a storage, and a module to be a bus master has a priority order for granting a bus access, and when the modules to be connected to the second bus are at least one I/O means and the access destination of the bus master is one I/O means, the storage means can store data for specifying the access up to a predetermined amount.

The system is a system wherein when a predetermined amount of information is stored in the storage area of the storage means and the processors and processor interfaces issue a bus access request as a bus master, the bus arbiter refers to the access destination information outputted by the bus master and when the access destination is not one of the I/O means, the bus arbiter grants a bus access to the bus master of the highest priority order and on the other hand, when the access destination is one of the I/O means, the bus arbiter grants a bus access to the bus master of the highest priority order among the bus masters performing an access operation to the memory interface.

According to the aforementioned means, in an information processing system comprising a processor, main storage, and I/O device and having a plurality of kinds of buses, a bus access is arbitrated as described below.

The system has the first bus and the second bus operating by a communication protocol different from that of the first bus and a plurality of modules are connected to the first and second buses. At least two ones among a plurality of modules connected to the first bus are bus masters and the bus masters output access destination information.

The bus conversion means performs at least protocol conversion of information between the first bus and the second bus. When the access destination of a bus master is a predetermined module, the storage means is structured so as to store data for specifying the access up to a predetermined amount.

The bus arbiter performs a process of arbitrating a bus access request issued from a bus master, that is, when the bus arbiter judges that one of the bus masters issues a bus access request when it performs an access operation, the bus arbiter refers to the access destination information and the data storage status of the storage means and decides whether or not to grant a bus access to the bus master.

More concretely, the bus arbiter operates as described below.

Namely, when a predetermined amount of information is stored in the storage area of the storage means, the bus arbiter refers to the access destination information outputted by the bus master issuing the bus access right request.

When the bus arbiter judges that the access destination is not the predetermined module where the storage means stores data, the bus arbiter grants a bus access to the bus master of the highest priority order issuing the bus access request. On the other hand, when the bus arbiter judges that the access destination is the predetermined module where the storage means stores data, the bus arbiter operates so as to grant a bus access to the bus master of the highest priority order issuing the bus access request except the bus master outputting the access information and arbitrates the bus.

According to a more concrete embodiment of the present invention, the operation thereof is as described below.

Firstly, the modules connected to the first bus contain at least processor interfaces for at least one processor and at least two processors and a memory interface connected to a storage. A module to be a bus master has a priority order for granting a bus access. When the modules to be connected to the second bus are at least one I/O means and the access destination of the bus master is one I/O means, the storage means can store data for specifying the access up to a predetermined amount.

When a predetermined amount of information is stored in the storage area of the storage means and the processors and processor interfaces issue a bus access request as a bus master, the bus arbiter refers to the access destination information outputted by the bus master.

When the access destination is not one of the I/O means, the bus arbiter grants a bus access to the bus master of the highest priority order. On the other hand, when the access destination is one of the I/O means, the bus arbiter performs an information process of granting a bus access to the bus master of the highest priority order among the bus masters performing an access operation to the memory interface.

According to the present invention, an access destination of a module requesting a bus access can be grasped before an access operation is performed actually, so that a bus access can be granted to a module performing access to the main storage and inter-processor communication which require high speed on a priority basis.

Therefore, an occurrence of a situation that execution of a transaction such as access to the main storage and inter-processor communication which require high speed is made wait due to comparatively low speed PIO access can be prevented, so that the bus access efficiency is improved. Even if the retry protocol is supported by the system bus, the number of retry transfers contributing to no data transfer can be reduced, so that the bus access efficiency is improved.

BRIEF DESCRIPTION OF THE DRAWINGS

FIG. 11 is an illustration showing granting or not granting of a bus right of the present invention when system bus arbiter requests compete.

DESCRIPTION OF THE PREFERRED EMBODIMENT

The embodiment of the present invention will be described hereunder with reference to the accompanying drawings.

Figure 1:
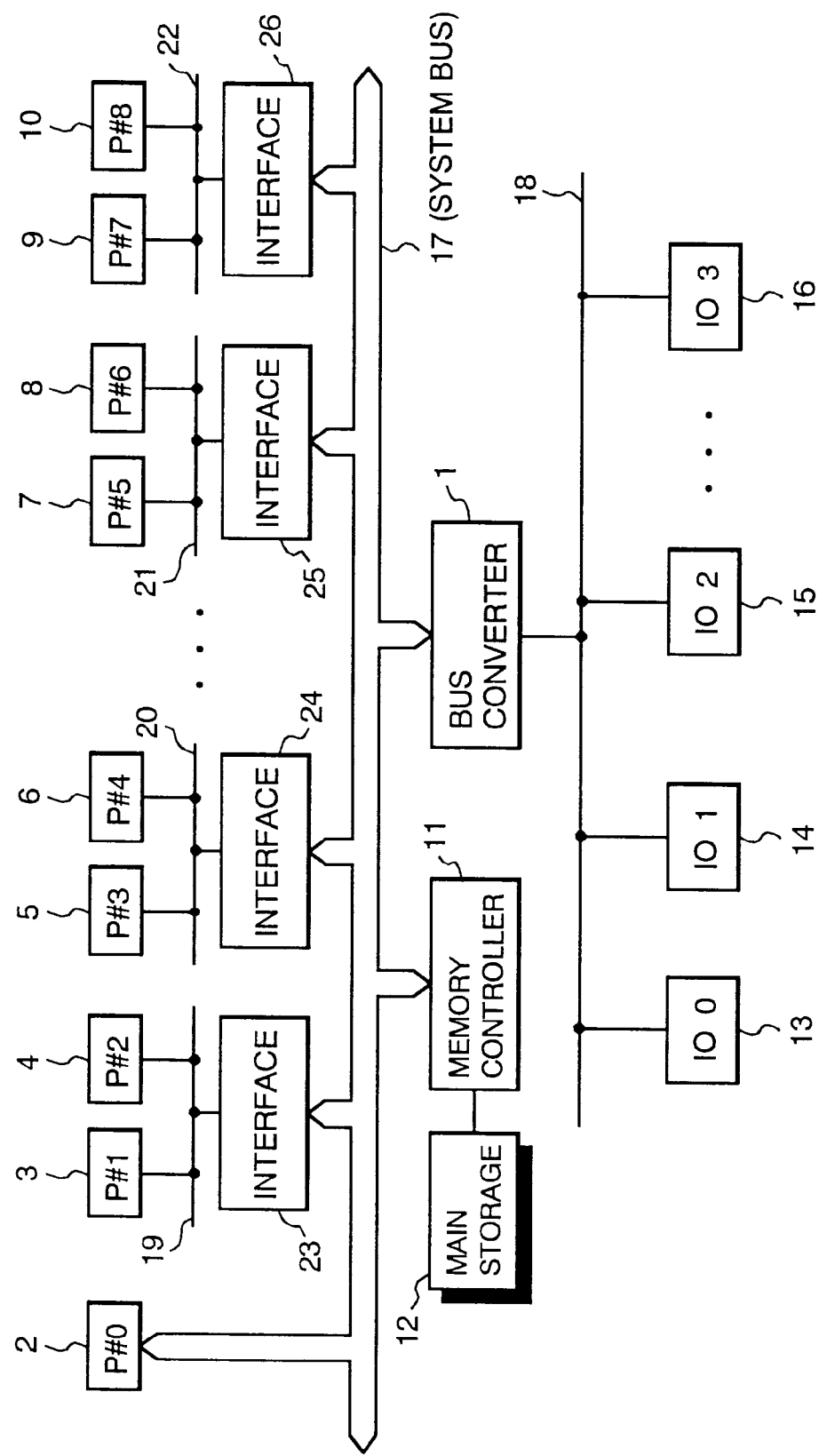
FIG. 1 is a block diagram of the information processing system of the present invention.

FIG. 1 is a block diagram showing a system configuration example of this embodiment.

Numeral 1 indicates a bus converter having at least a function performing protocol conversion between a system bus 17 and an IO bus 18. A detailed constitution of the bus converter will be explained later.

Numerals 2, 3, 4, 5, 6, 7, 8, 9, and 10 indicate processors and they are referred to as P#0, P#1, P#2, P#3, P#4, P#5, P#6, P#7, and P#8 respectively. They can be realized, for example, by a 64-bit CPU.

Numeral 12 indicates a main storage and 11 indicates a memory controller for controlling access to the main memory 12. Numerals 13, 14, 15, and 16 indicate I/O devices and they are referred to as IO0, IO1, IO2, and IO3 respectively. As an I/O device, for example, an output device such as a display unit or a printer, an input device such as a keyboard or a mouse, or a computer for a terminal may be considered. When an information processor such as a terminal computer is used as an I/O device, a so-called client server system can be realized.

Numeral 17 indicates a system bus corresponding to a multi-processor and 18 indicates an IO bus.

Numerals 19, 20, 21, and 22 indicate processor buses and for example, the processor bus 19 is a bus to which P#1 and P#2 are connected.

Numeral 23 indicates an interface having an interface function installed between the processor bus 19 and the system bus 17, 24 an interface having an interface function installed between the processor bus 20 and the system bus 17, 25 an interface having an interface function installed between the processor bus 21 and the system bus 17, and 26 an interface having an interface function installed between the processor bus 22 and the system bus 17.

As shown in the drawing, modules connected to the system bus 17 are the bus converter 1, the memory controller 11, the interfaces 23, 24, 25, and 26, and the processor P#0 and the processor and interfaces function as a bus master respectively and perform an access operation to the main storage 12 and the IO devices 13 to 16.

The access state of this system will be explained later.

Figure 2:
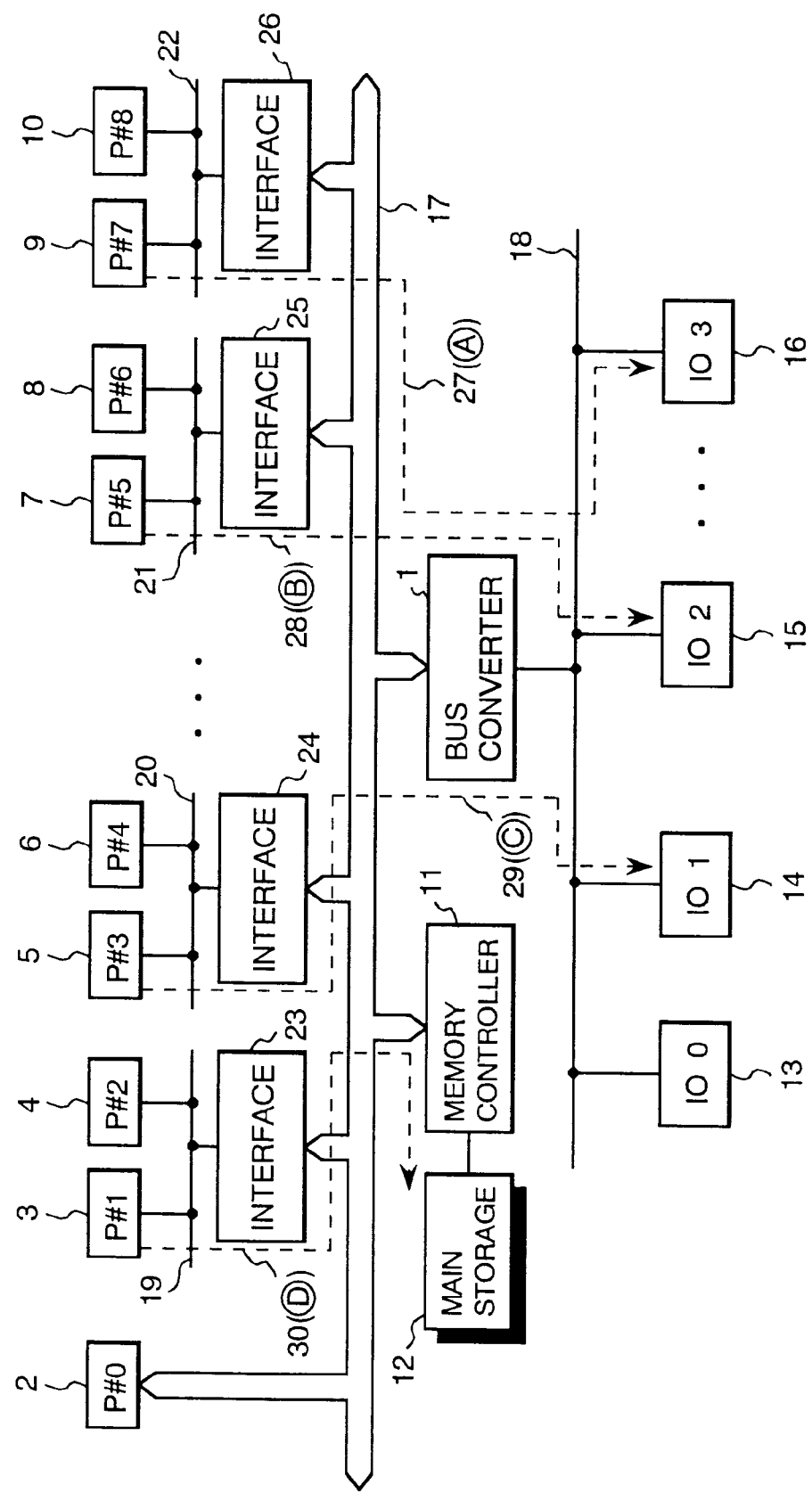
FIG. 2 is an illustration showing an example of data flow of the system.

Next, various access states and transfer of information to each of them will be outlined in FIG. 2.

In FIG. 2, numeral 27 indicates "PIO write access" (Access (A)) which is a writing operation from the processor P#7 to I03. Numeral 28 indicates "PIO write access" (Access (B)) which is a writing operation from the processor P#5 to I02. In the same way, numeral 29 indicates "PIO write access" (Access (C)) which is a writing operation from the processor P#3 to IO0 and numeral 30 indicates "memory read access" (Access (D)) which is a reading operation from the processor P#1 to the main storage 12.

Namely, in each access, each processor, correctly expressing, each interface connected to the system bus 17 becomes a bus master and performs "PIO access" for accessing the IO devices or "memory access" for accessing the main storage 12. The memory access is made generally at high speed by using the system bus 17, while the PIO access is made at low speed.

Although not shown in FIG. 2, various information transfer states can be considered such that the processor P#0 performs an access operation via no interface or a certain processor communicates necessary information with another processor, that is, performs so-called inter-processor communication.

Next, with reference to FIG. 3, the constitution of a bus converter which exists between a system bus of a multi-processor system and an IO bus and has at least a function for performing protocol conversion will be explained. This embodiment has a constitution that a system bus arbiter 112 is contained in the bus converter 1. However, needless to say, a constitution that the system bus arbiter 112 is not built in the bus converter 1 may be used. When the bus converter 1 comprises a 1-chip LSI, it is desirable that the system has a constitution that the system bus arbiter 112 is contained in the same chip.

This apparatus is broadly divided into a system bus controller 125, a bus conversion controller 126, and an IO bus controller 127.

Figure 3:
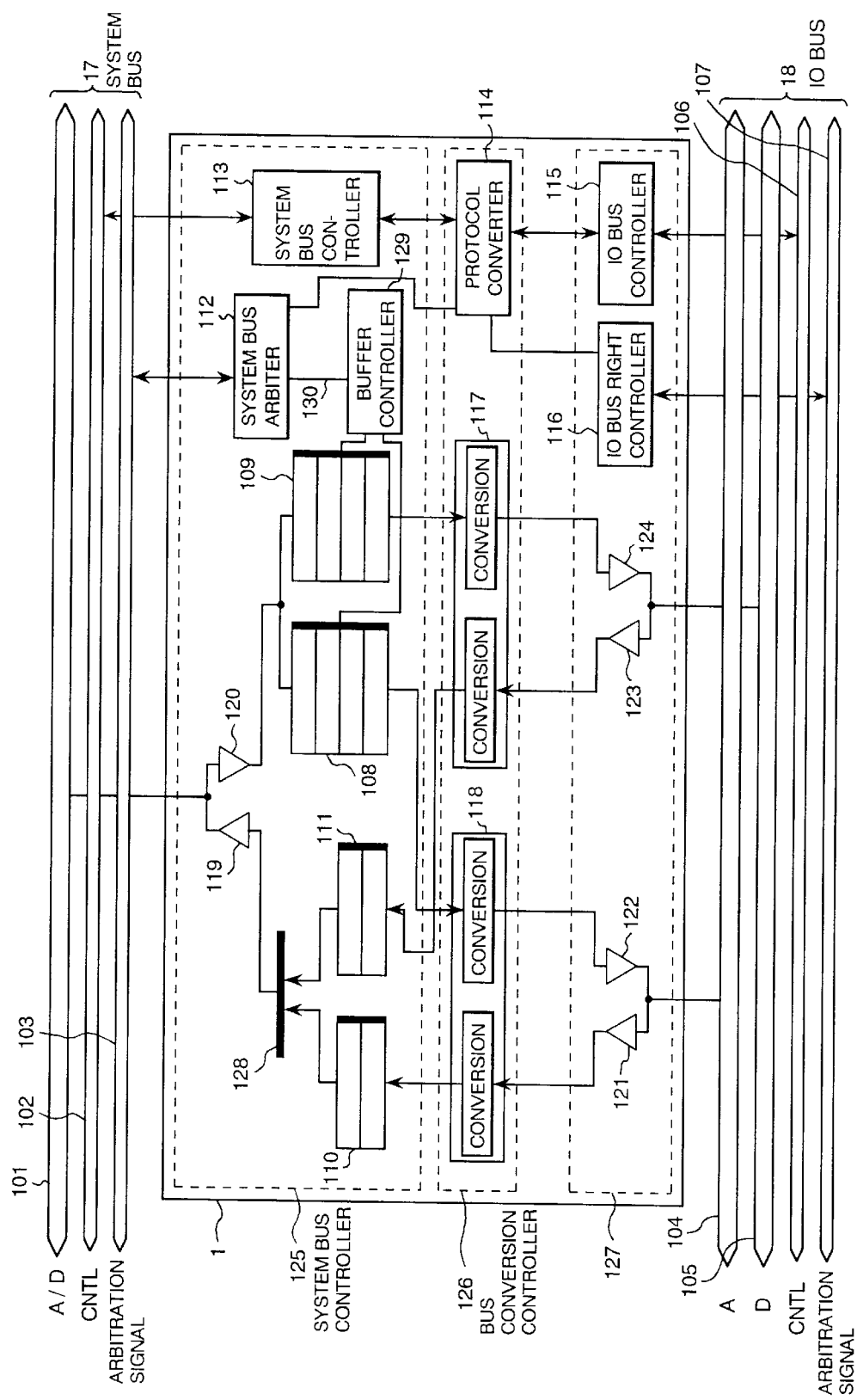
FIG. 3 is a block diagram of a bus converter having asiction for performing protocol conversion between a system bus and an I/O bus.

As shown in FIG. 3, the system bus 17 comprises an address/data line A/D 101, a control signal line CNTL 102, and an arbitration signal line 103. The system bus 17 transmits various data on a time division basis.

The signal line 101 has a function for transmitting both an address and data and an address and data are transmitted, for example, on a time division basis.

An IO bus 18 comprises an address line (A) 104, a data line (D) 105, a control line (CNTL) 106 of the IO bus 18, and an arbitration signal line 107 of the IO bus 18.

Furthermore, other components will be explained hereunder. Numeral 108 indicates an address buffer for storing an address for "PIO access" from the system bus 17 and 109 indicates a data buffer for storing data for "PIO write access" from the system bus 17 and "DMA response" from the IO bus 18. As shown in the drawing, they can store addresses and data for deciding four accesses. Therefore, 5 or more accesses cannot be received unless the process for the addresses and data stored already is completed.

Numeral 110 indicates an address buffer for storing an address for "DMA read access" from the IO bus 18, and 111 indicates a data buffer for storing response data of "PIO read access" from the system bus 17 and data of "DMA write access" from the IO bus 18, and they can store two addresses and data as shown in the drawing.

A selector 128 has a function for selecting one of an address, that is, information stored in the address buffer 110 and data, that is, information stored in the data buffer and outputting it to 119.

Numeral 112 indicates a system bus arbiter contained in the bus converter 1 and the internal structure thereof will be explained in detail later.

A system bus controller 113 generates a signal for controlling the system bus and supplies a control signal to the CNTL. A protocol converter 114 performs a process of converting the protocol of transmission data between the system bus 17 and the IO bus 18.

An IO bus controller 115 generates a signal for controlling the IO bus and supplies a control signal to the CNTL 107.

A bus right controller 116 transmits or receives a signal to or from the arbitration signal line 107 and controls the bus right of the IO bus.

A data converter 117 performs a data conversion process (bus size conversion or endian conversion can be considered) between the system bus 17 and the IO bus 18.

On the other hand, an address converter 118 performs an address conversion process between the system bus 17 and the 10 bus 18.

Numeral 119 indicates an output buffer and 120 indicates an input buffer and they have a function for storing information to be outputted onto the A/D line 101 and a function for storing information to be obtained from the A/D line 101 respectively.

Furthermore, numeral 121 indicates an input buffer and 122 indicates an output buffer and they have a function for storing an address obtained from the A line 104 and a function for storing an address to be outputted onto the A line 104 respectively.

Furthermore, numeral 123 indicates an input buffer and 124 indicates an output buffer and they have a function for storing data obtained from the D line 105 and a function for storing data to be outputted onto the D line 105 respectively.

A buffer controller 129 controls the storage operation of the address buffer 108 and the data .buffer 109 and a control signal line 130 is a signal line for supplying a control signal to the system bus arbiter 112 from the buffer controller 129 and concretely a signal line for informing the system bus arbiter 112 of whether a predetermined amount of information is stored in the buffers 108 and 109 or not. In this embodiment, a predetermined amount of information to be stored in the buffers is explained for convenience as a state that there is no empty area left in the buffers. However, in view of the bus access efficiency, it can be considered to define a small amount of remaining empty area of the buffer as a predetermined amount.

Figure 4:
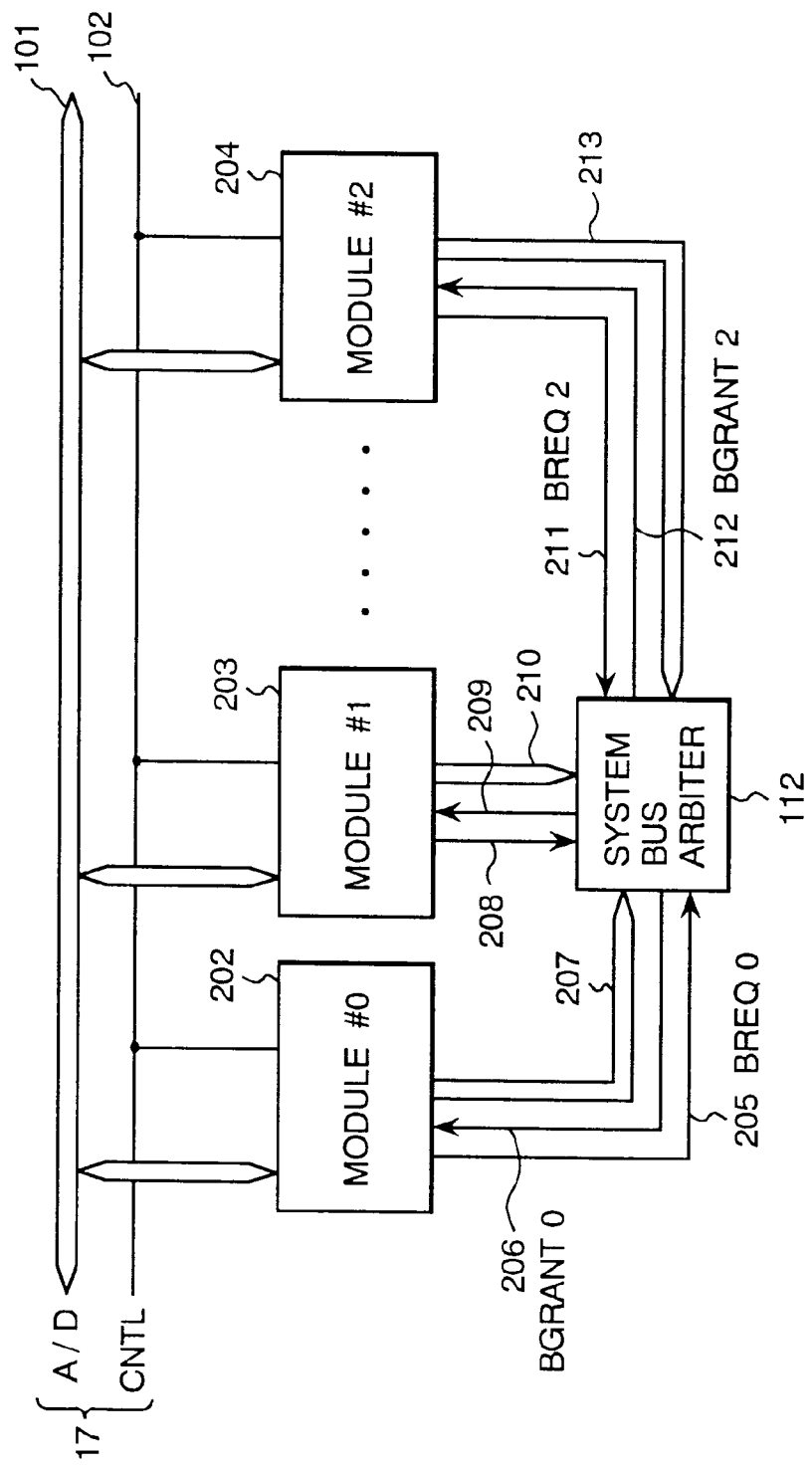
FIG. 4 is an illustration showing the principle of the bus control method of the present invention.

FIG. 4 is an illustration showing the principle of the present invention.

The system bus arbiter 112 is contained in the bus converter 1 shown in FIG. 3 and performs arbitration control of a bus access.

Numerals 202, 203, and 204 indicate modules #0, #1, and #2 connected to the system bus 17. The modules shown in this drawing are characterized in that they function as a bus master, output a bus right request signal BREQ, are given a bus right grant signal (BGRANT) when predetermined, and further output a signal showing the access destination when the bus right request signal is to be outputted.

For example, the module #0 (202) outputs a bus right request signal (BREQ0) 205 to the system bus arbiter 112, receives a bus right grant signal (BGRANT0) 206 from the system bus arbiter 112, and outputs access destination information which is information indicating the access destination via an access destination code signal line 207 at the same time.

In the same way, the module #1 (203) outputs a bus right request signal (BREQ1) 208 to the system bus arbiter 112, receives a bus right grant signal (BGRANT1) 209 from the system bus arbiter 112, and outputs access destination information via an access destination code signal line 210 at the same time. Also in the same way, the module #2 (204) outputs a bus right request signal (BREQ2) 211 to the system bus arbiter 112, receives a bus right grant signal (BGRANT2) 212 from the system bus arbiter 112, and outputs access destination information via an access destination code signal line 213 at the same time.

As mentioned above, each module outputs a bus right request signal to the system bus arbiter 112 and when predetermined, that is, when a bus access is given, each module is given a bus right grant signal from the system bus arbiter 112. However, the present invention is characterized in that the system bus arbiter 112 performs arbitration control with reference to the access destination information from each module.

When the system bus arbiter 112 actually performs arbitration control, it also refers to information on whether the buffers 108 and 109 shown in FIG. 3 are full in addition to the aforementioned access destination information. Detailed flow of the process will be explained later with reference to FIG. 8.

The modules shown in FIG. 4 are concretely the processors and processor buses shown in FIG. 1. In this specification, various control signals are signals asserting in the low state in principle, that is, performing a so-called active low operation.

Figure 5:
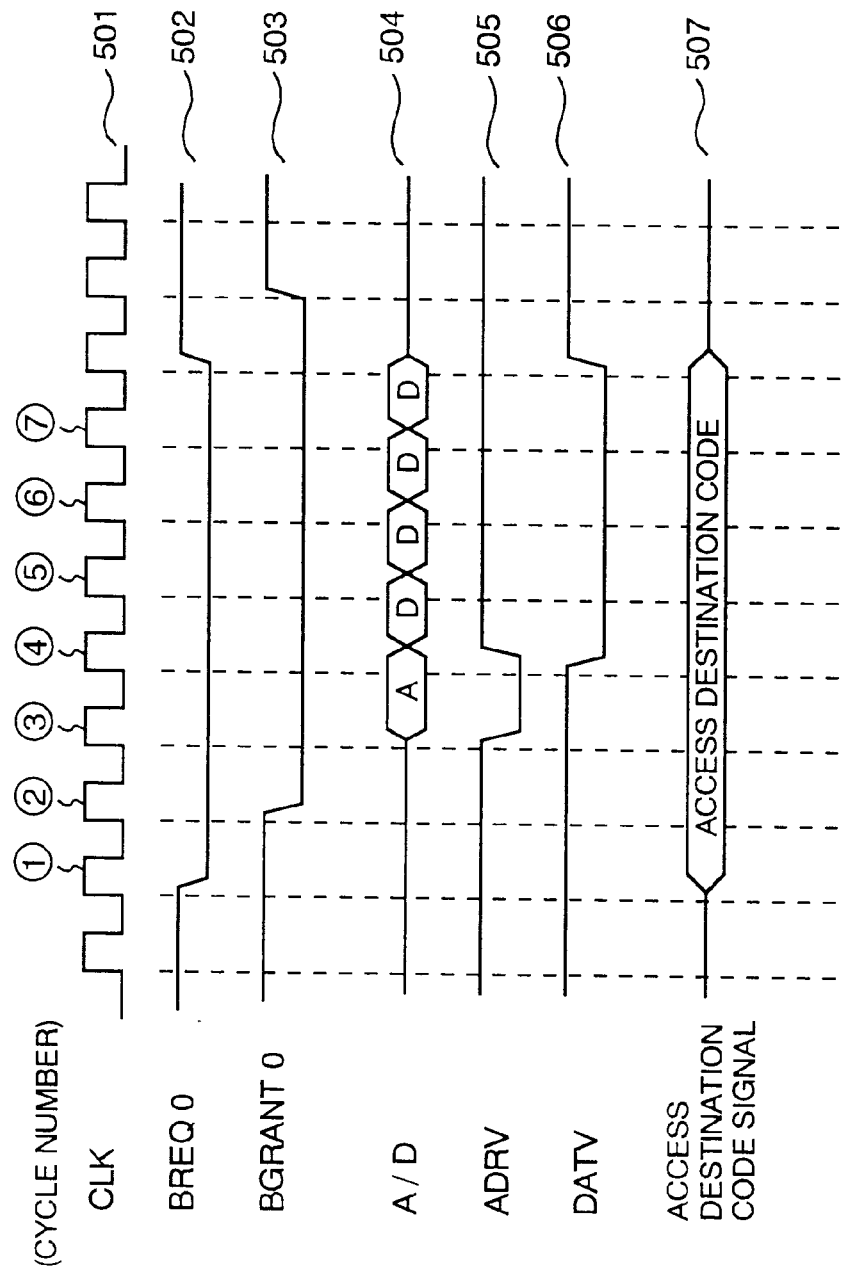
FIG. 5 is an illustration showing a timing chart of various as data in the system bus.

Next, timing chart examples of various signals in information transfer are shown in FIG. 5.

This timing chart uses the module #0 shown in FIG. 4.

Numeral 501 indicates the waveform of a system clock (CLK) specifying one cycle of a bus and each number with a circle indicates the cycle number.

Numeral 502 indicates the waveform of a bus right request signal (BREQ0) outputted to the system bus arbiter from the module #0 and 503 indicates the waveform of a bus right grant signal (BGRANT0) to the module #0 from the system bus arbiter.

The situation that BGRANT0 is asserted one cycle after BREQO 502 is asserted can be seen.

Numeral 504 indicates the waveform of an address/data line (A/D) and since the address/data line is multiplexed, the situation that an address and data are transmitted on a time division basis can be seen. In the examples shown in FIG. 5, after BGRANT0 is asserted, that is, after a bus access is given, address information for one cycle is transmitted and then data information for 3 cycles is transmitted.

Numeral 505 indicates the waveform of an address cycle designating signal line (ADRV), that is, a signal line showing that address information is transmitted to a bus and 506 indicates the waveform of a data cycle designating signal line (DATV), that is, a signal line showing that data information is transmitted to a bus and it can be seen that both of them are asserted when an address and data are transmitted onto the buses can be seen.

Numeral 507 indicates the waveform of an access destination code signal for transmitting access destination information to the system arbiter from the module #0. It can be seen that the access destination code is outputted at the same time with assertion of BREQ0 502. As an access destination code, it is desirable to predetermine "1" when the access destination is the main storage and "0" when the access destination is the IO device.

Figure 6:
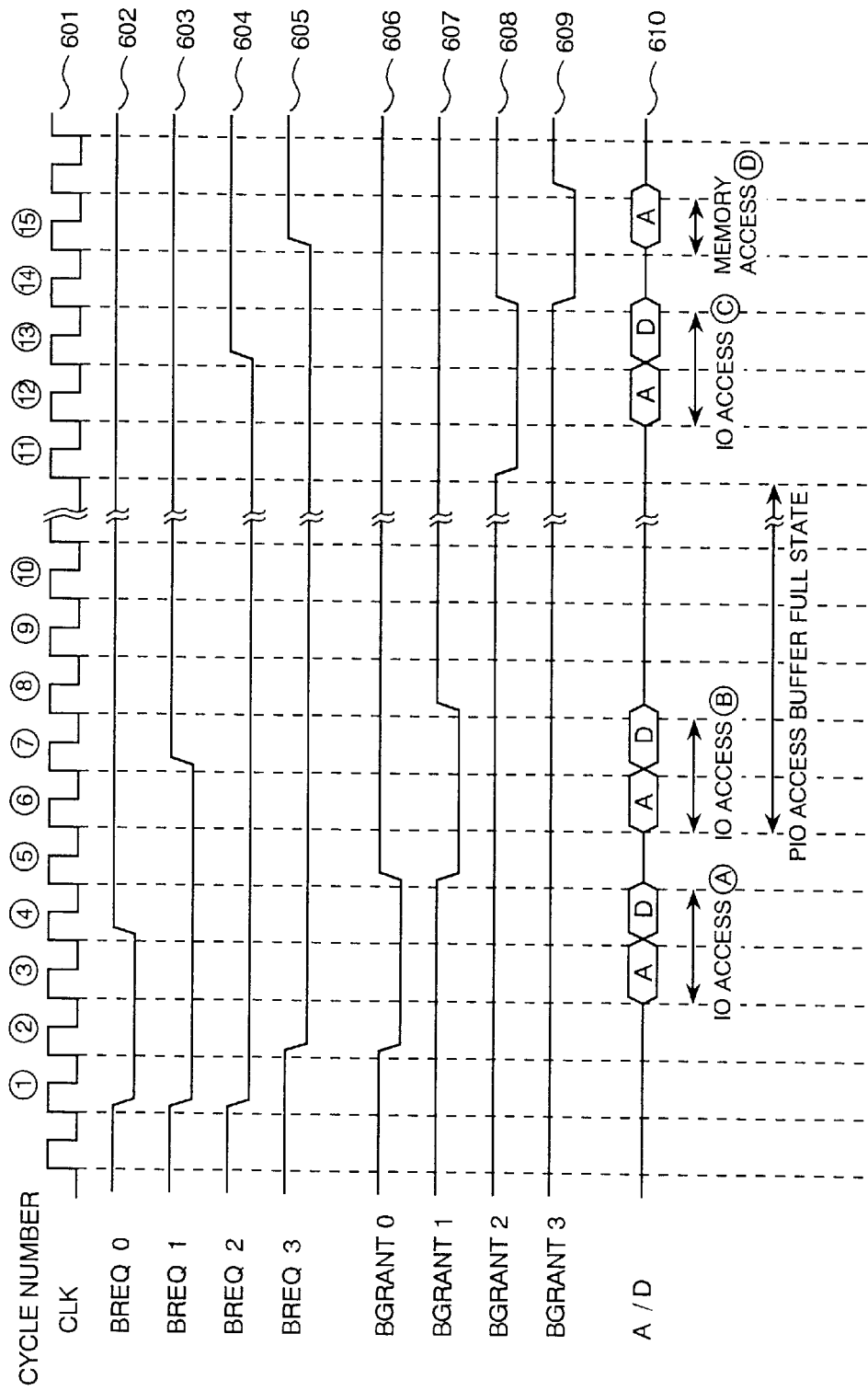
FIG. 6 is an illustration showing a timing chart of various data in a bus by the conventional bus control method.
Figure 7:
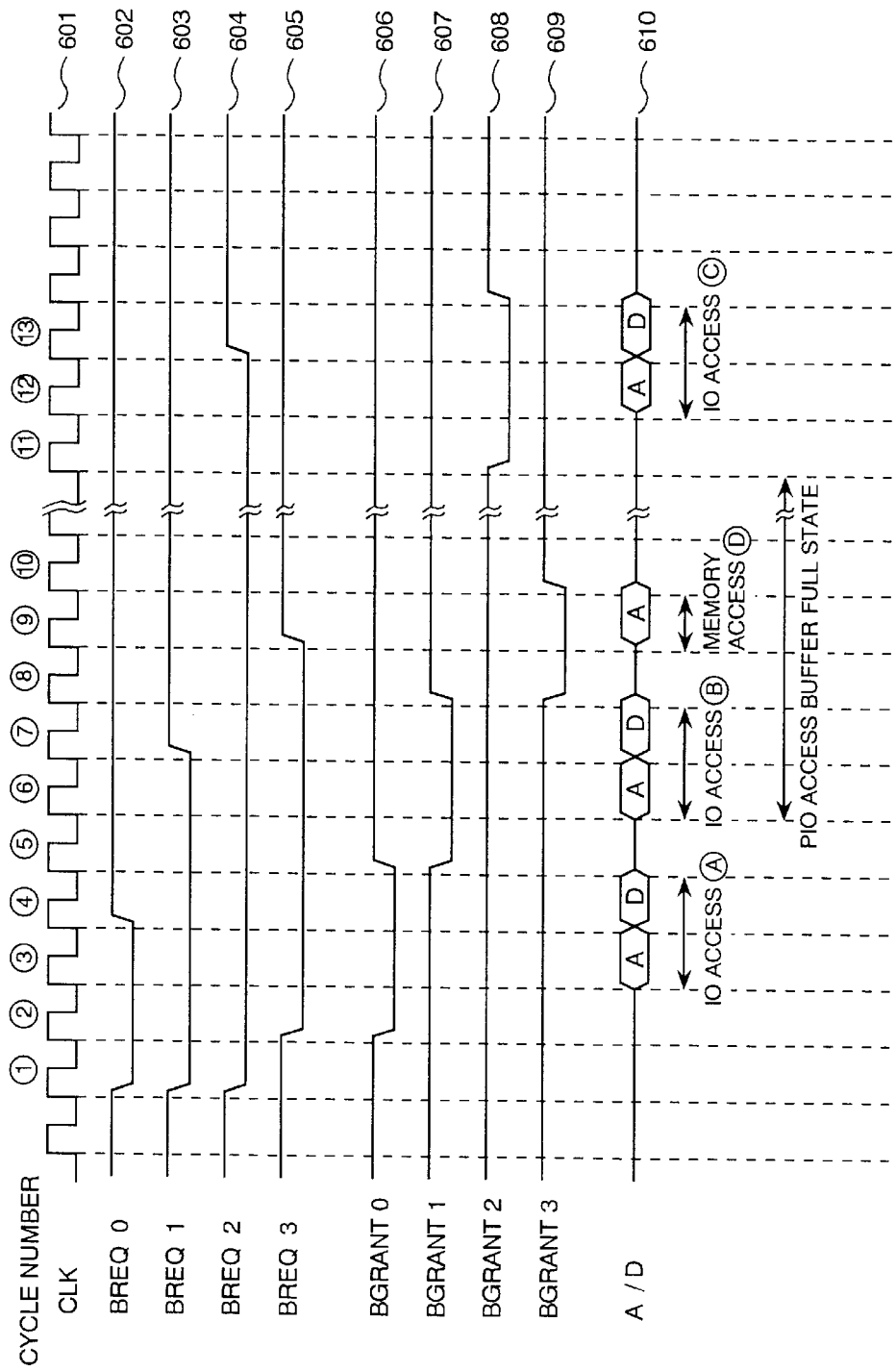
FIG. 7 is an illustration showing a timing chart of various data in a bus by the bus control method of the present invention.

Next, timing charts of the prior art and the present invention are shown in FIGS. 6 and 7. Good results obtained by the present invention against the prior art will be explained later with reference to the two drawings. Only the outline of the timing charts will be explained hereunder.

Firstly, FIG. 6 will be outlined. In this drawing, 4 modules, concretely those for the interfaces 26, 25, 24, and 23 shown in FIG. 1 are supposed.

Numeral 601 indicates the waveform of a system clock (CLK) specifying one cycle of a bus and each number with a circle indicates the cycle number.

Numeral 602 indicates the waveform of a bus right request signal (BREQ0) outputted to the system bus arbiter 112 contained in the bus converter 1 from the interface 26, and in the same way, 603 indicates the waveform of a bus right request signal (BREQ1) outputted to the system bus arbiter 112 from the interface 25, and 604 indicates the waveform of a bus right request signal (BREQ2) outputted to the system bus arbiter 112 from the interface 24, and 605 indicates the waveform of a bus right request signal (BREQ3) outputted to the system bus arbiter 112 from the interface 23.

BREQ0, BREQ1, BREQ2, and BREQ3 are signals outputted from each interface in correspondence to the access (A), access (B), access (C), and access (D) shown in FIG. 2.

The priority order of access is the interfaces 26, 25, 24, and 23 in the descending order.

According to FIG. 6, BREQ0, BREQ1, and BREQ2 are asserted almost at the same time and BREQ3 is asserted one cycle later.

Namely, the operations for the access (A), access (B), and access (C) are started almost at the same time and the operation for the access (D) is started one cycle later.

On the other hand, numeral 606 indicates the waveform of a bus right grant signal (BGRANT0) given to the interface 26 from the system bus arbiter 112, and in the same way, 607 indicates the waveform of a bus right grant signal (BGRANT1) given to the interface 25 from the system bus arbiter 112, and 608 indicates the waveform of a bus right grant signal (BGRANT2) given to the interface 24 from the system bus arbiter 112, and 609 indicates the waveform of a bus right grant signal (BGRANT3) given to the interface 23 from the system bus arbiter 112. Numeral 610 indicates the waveform of an address/data line (A/D). Each portion indicated by A shows that an address is transmitted and each portion indicated by D shows that data is transmitted.

In FIG. 7, a part assigned with the same number as that shown in FIG. 6 indicates the same part.

FIG. 6 shows a timing chart by the prior art and FIG. 7 indicates a timing chart by the present invention. Although details will be described later, FIG. 7 shows that according to the present invention, the access (D) which is a memory access to the main storage is made next to the process for the access (B) without being made wait.

Figure 10:
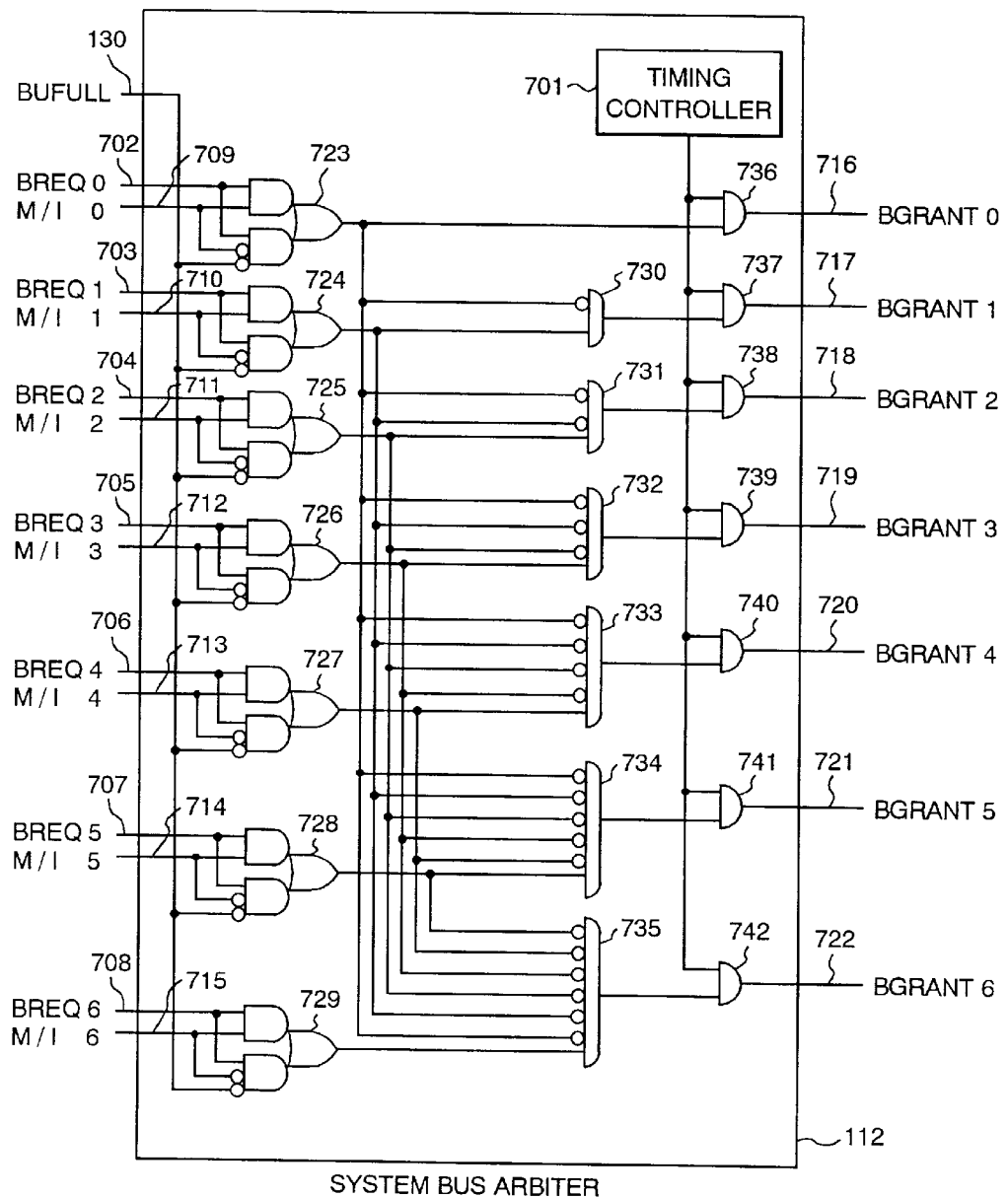
FIG. 10 is a circuit diagram showing a configuration example of a system bus arbiter.

Next, an example of the circuit constitution of the system bus arbiter is shown in FIG. 10.

Only the circuit constitution will be explained hereunder and the operation thereof will be explained later.

Numeral 130 indicates a control signal line (BUFULL: 1 in the access disabled (full) state and 0 in the access enabled (empty) state) for notifying the system bus arbiter of that the IO access buffers (108 and 109 shown in FIG. 3) are full (full state) and cannot receive IO access from the buffer controller 129.

A timing controller 701 has a function for adjusting the timing of giving a bus right grant signal.

Numerals 702, 703, 704, 705, 706, 707, and 708 indicate bus right request signals (BREQ0 to BREQ6) and a case that there are 6 modules which can be bus masters is supposed.

Numerals 709, 710, 711, 712, 713, 714, and 715 indicate signal lines (1 in the case of memory access and 0 in the case of IO access) indicating that the access destinations for the bus right request signals 702 to 708 are the main storage (memory access) or the IO device (IO access).

Numerals 716, 717, 718, 719, 720, 721, and 722 indicate bus access grant signals (BGRANT0 to BGRANT6) and a bus access grant signal is supplied to a module which is given a bus access.

Numerals 723, 724, 725, 726, 727, 728, and 729 indicate logical circuits comprising an AND gate and an OR gate and numerals 730, 731, 732, 733, 734, 735, 736, 737, 738, 739, 740, 741, and 742 indicate logical circuits comprising an AND gate. An example of operations of these logical circuits will be shown later so as to explain the operations briefly.

The hardware configuration and the principle of the present invention are mainly explained above. The hardware operation will be explained mainly hereunder.

Firstly, the hardware operation when a memory access or PIO access as shown in FIG. 2 occurs in the multi-processor system configuration shown in FIG. 1 will be explained.

The PIO write access (access (A)) to 103 (16) from the processor P#7 (9) is that when the processor P#7 executes access activation, the interface 26 activated from the processor P#7 via the processor bus 22 outputs a bus access request signal requesting a bus access of the system bus 17. When the interface 26 obtains a bus access, the processor P#7 issues and sends a PIO write transaction to the bus converter 1 via the processor bus 22 and the interface 26.

The bus converter 1 receiving a PIO write transaction requests a bus access of the IO bus 18 and obtains a bus access and then control of issuing a write transaction onto the IO bus 18 is executed (access (A) shown in FIG. 2).

Also for the PIO write access to I02 (15) from the processor P#5 (7) and the PIO write access to IO1 (14) from the processor P#3 (5), the same control operation is performed (accesses (B) and (C) shown in FIG. 2).

On the other hand, the write access to the main storage 12 from the processor P#1 (3) is that the interface 23 accepting access activation from the processor P#1 via the processor bus 19 outputs a bus access request signal requesting a bus access of the system bus 17. When the interface 23 obtains a bus access, the processor P#1 issues and sends a write transaction to the memory controller 11. The memory controller 11 receiving a write transaction executes the designated memory write access to the main storage 12 (access (D) shown in FIG. 2).

The bus converter 1 receiving a PIO write transaction, as shown in FIG. 3, stores a write address in the address buffer 108 via the input buffer 120 and write data in the data buffer 109 once.

Thereafter, the PIO write address and data are converted as predetermined when necessary by the address converter 118 and the data converter 117 and outputted to the IO bus 18 via the output buffers 122 and 124.

As shown in FIG. 3, the IO bus 18 includes buses 104 and 105 corresponding to address information and data information respectively and is a so-called separate bus of address and data.

Assuming that a plurality of PIO write accesses are activated continuously, the bus converter 1 in this embodiment can collect up to 4 transactions in the buffers 108 and 109.

The bus converter 1 contains the system bus arbiter 112 having a function for arbitrating a bus access of the system bus. The bus control method executed by this system bus arbiter is as shown below.

The operation speed of the IO bus 18 is slow compared with that of the system bus 17, so that a case that the 4 steps of buffer for PIO access installed in the bus converter 1 enter the full state may occur. If PIO access is further activated from the processor side in this state, the system bus arbiter 112 cannot receive a sent transaction unless the retry function is supported by the system bus protocol, so that the system bus arbiter 112 performs a control operation that no bus access is granted to the module (bus master) on the system bus 17 until an empty area is generated in the buffer.

When the PIO access buffer is in the full state and a memory access request is issued from a processor, the system bus arbiter is structured so that it has a function as indicated below so as to give a bus right to the processor.

Firstly, the bus master is structured so that the signal line issues an access destination code signal for transmitting access destination information which is information indicating the access destination to be accessed by the bus master which is the corresponding module in addition to a bus access request signal (BREQ) and a bus access grant signal (BGRANT).

The access destination (main storage, IO space, interprocessor communication, etc.) of an access destination code signal can be decided by the address thereof, so that it is possible to structure so that the interfaces (23, 24, 25, and 26) connected to the system bus decode and output an address outputted from a process which is a bus master.

A connection example between each module which can be a bus master and the system bus arbiter is as shown in FIG. 4. On the other hand, the system bus arbiter 112 receives a control signal notifying whether the PIO buffer is in the full state or not, that is, the PIO buffer can receive PIO access or not from the bus converter 1. Such notification is given by using the signal line 130 shown in FIG. 3. When the PIO buffer is in the full state, it is reported to the system bus arbiter 112 from the buffer controller 129 that the PIO buffer cannot receive PIO access.

The control method executed by the system bus arbiter 112 is as shown below.

Figure 8:
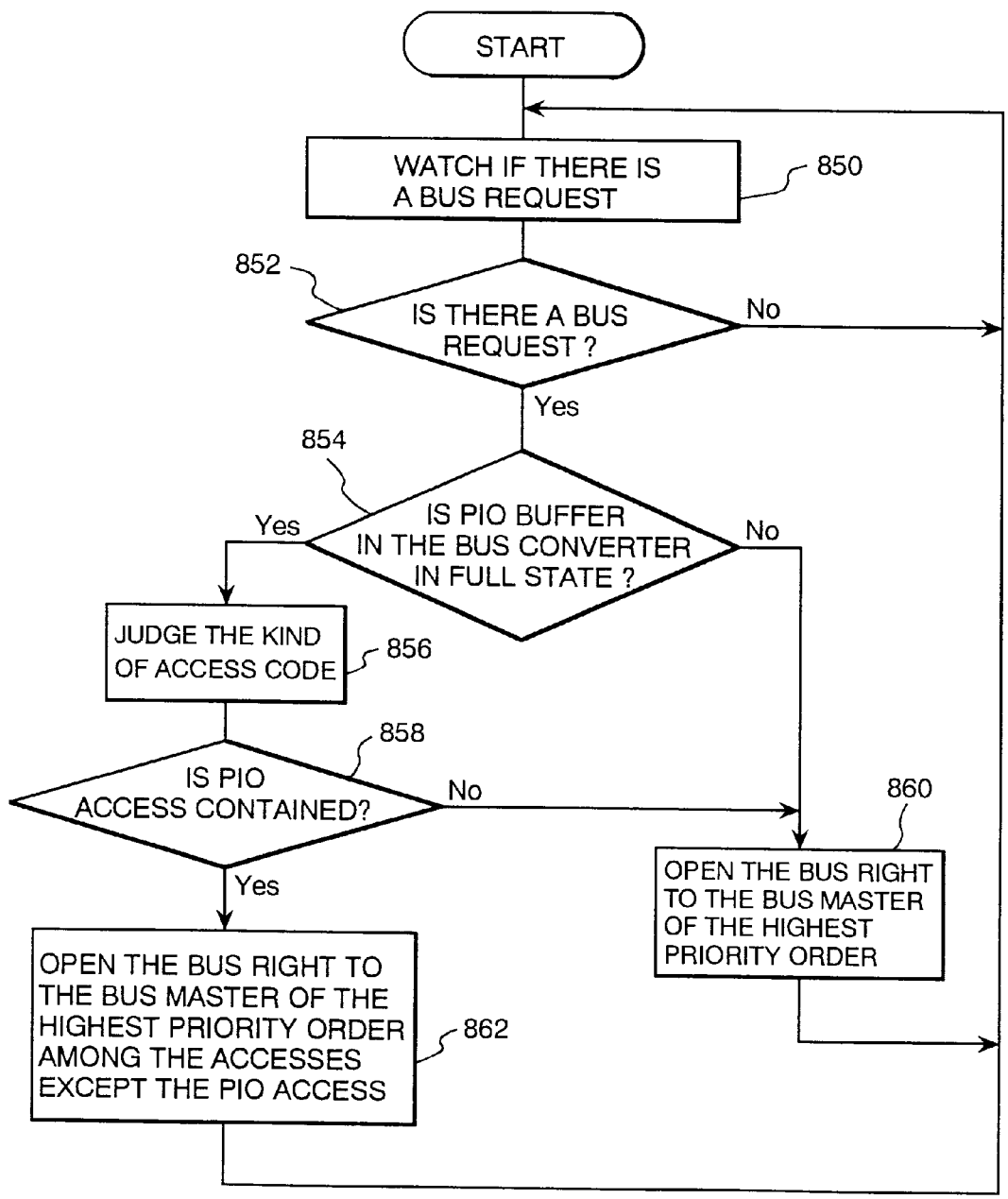
FIG. 8 is a flow chart showing the processing procedure performed by a system bus arbiter.

A series of control steps will be described below with reference to the flow chart shown in FIG. 8.

The following processes are executed by the system bus arbiter 112.

Firstly, the system bus arbiter 112 watches if there is a bus access request signal and judges whether there is a bus access request signal or not (Steps 850, 852).

When there is no bus access request signal, the system bus arbiter 112 returns to Step 850 and maintains the wait state. On the other hand, when there is a bus access request signal, the system bus arbiter 112 goes to Step 854 and checks whether the PIO buffer installed in the bus converter 1 can receive address and data information specifying PIO access or not, that is, the PIO buffer is in the full state or not by referring to a signal on the signal line 130 (Step 854).

If the PIO buffer is in the state of being capable of receiving address and data information, the system bus arbiter 112 grants a bus access to the module of the highest priority order predetermined among the modules outputting a bus right request signal (Step 860).

On the other hand, when the PIO buffer installed in the bus converter 1 is in the state of being incapable of receiving address and data information, the system bus arbiter 112 refers to an access destination code signal outputted from each bus master together with a bus right request signal and checks whether PIO access is contained in it or not (Steps 856, 858).

When PIO access is contained, the system bus arbiter 112 grants a bus access to the bus master of the highest priority order predetermined (this is the bus master performing memory access to the main storage in the system example shown in FIG. 1 and has the highest priority order) among the accesses except the PIO access (Step 852). On the other hand, when PIO access is not contained, the system bus arbiter 112 grants a bus access to the module of the highest access priority order predetermined among the modules outputting a bus right request signal (Step 860). The above is the control operation performed by the system bus arbiter 112.

Next, a case of competition between PIO access and memory access in which good results can be obtained by the present invention will be supposed and explained.

A case that as shown in FIG. 2, a transfer request is generated in the order of PIO write access (access (A)) performed to I03 (16) from the processor P#7 (9), PIO write access (access (B)) performed to I02 (15) from the processor P#5 (7), PIO write access (access (C)) performed to I01 (14) from the processor P#3 (5), and write access (access (D)) performed to the main storage 12 from the processor P#1 (3) and bus access requests compete each other will be considered.

With respect to the priority order predetermined, the interface 26 is highest and the interfaces 25, 24, and 23 descend sequentially in this order. The operation outline in this case and the effects of the present invention will be explained hereunder with reference to FIGS. 6 and 7.

The system bus 17 in this embodiment operates in synchronization with the system clock (CLK) shown in FIG. 6.

Bus access request signals outputted by the interfaces 26, 25, 24, and 23 are BREQ0 (602), BREQ1 (603), BREQ2 (604), and BREQ3 (605) respectively and bus access right grant signals for the interfaces 26, 25, 24, and 23 are BGRANT0 (606), BGRANT1 (607), BGRANT2 (608), and BGRANT3 (609) respectively. A module to which a BGRPNT signal is given, that is, bus access grant is given can use the bus one clock later. A transfer protocol such that when a bus master obtaining a bus occupation right negates a bus access request signal (BREQ) (makes the signal high) one clock before abandoning the bus access right, the system bus arbiter can negate the BGRANT signal (makes the signal high) is used.

The interfaces 26, 25, and 24 accepting PIO access activation from the processors P#7, P#5, and P#3 at the cycle No. (1) assert bus access request signals. The system bus arbiter receiving these bus access request signals grants a bus access to the interface 26 first according to the predetermined priority order.

When the access operation performed by the interface 26 to which a bus access is granted, that is, the IO access (access (A)) ends, a bus access is granted to the interface 25 of the second-highest priority and the PIO access operation (access (B)) of the interface 25 is performed by activation from the processor P#5. At this time, the PIO buffer contained in the bus converter 1 enters the full state and this full state continues up to the cycle just prior to the cycle number (11).

Assuming that the conventional arbitration method is used in this case, the bus converter 1 cannot receive PIO access any more, so that the bus converter 1 executes control of granting no bus access to any bus master though BREQ2 and BREQ3 are asserted. As a result, the PIO access (access (C)) and memory access (access (D)) are made wait until the cycle number (11). Therefore, all the access operations end at the cycle number (15).

These states are shown in FIG. 6 and the drawing shows that the memory access requiring a short time of access operation is made wait for a considerably long time.

On the other hand, when the arbitration method of the present invention is used, the system bus arbiter 112 grasps first that it cannot receive PIO access any more by notification of a signal indicating the full state given from the buffer controller 129 via the control signal line 130.

Next, the system bus arbiter refers to an access destination code signal outputted from each bus master together with a bus right request signal and checks whether PIO access is contained in the access or not. When PIO access is contained, the system bus arbiter grants a bus access to the bus master of the highest priority order predetermined except the PIO access.

Namely, the system bus arbiter controls the bus so as to execute the write access (access (D)) to the main storage 12 from the processor P#1 for which the bus right request signal (BREQ3) from the interface 23 is asserted on a priority basis. According to the present invention, the access to the main storage (memory access) is prevented from waiting under the influence of the performance of the IO bus and the execution time of memory access or inter-processor communication requiring high speed can be made earlier than the conventional one.

These states are shown in FIG. 7 and the drawing shows that the memory access D is executed when the PIO access buffer is in the full state and the time of execution of memory access is made earlier than the conventional one.

Figure 9:
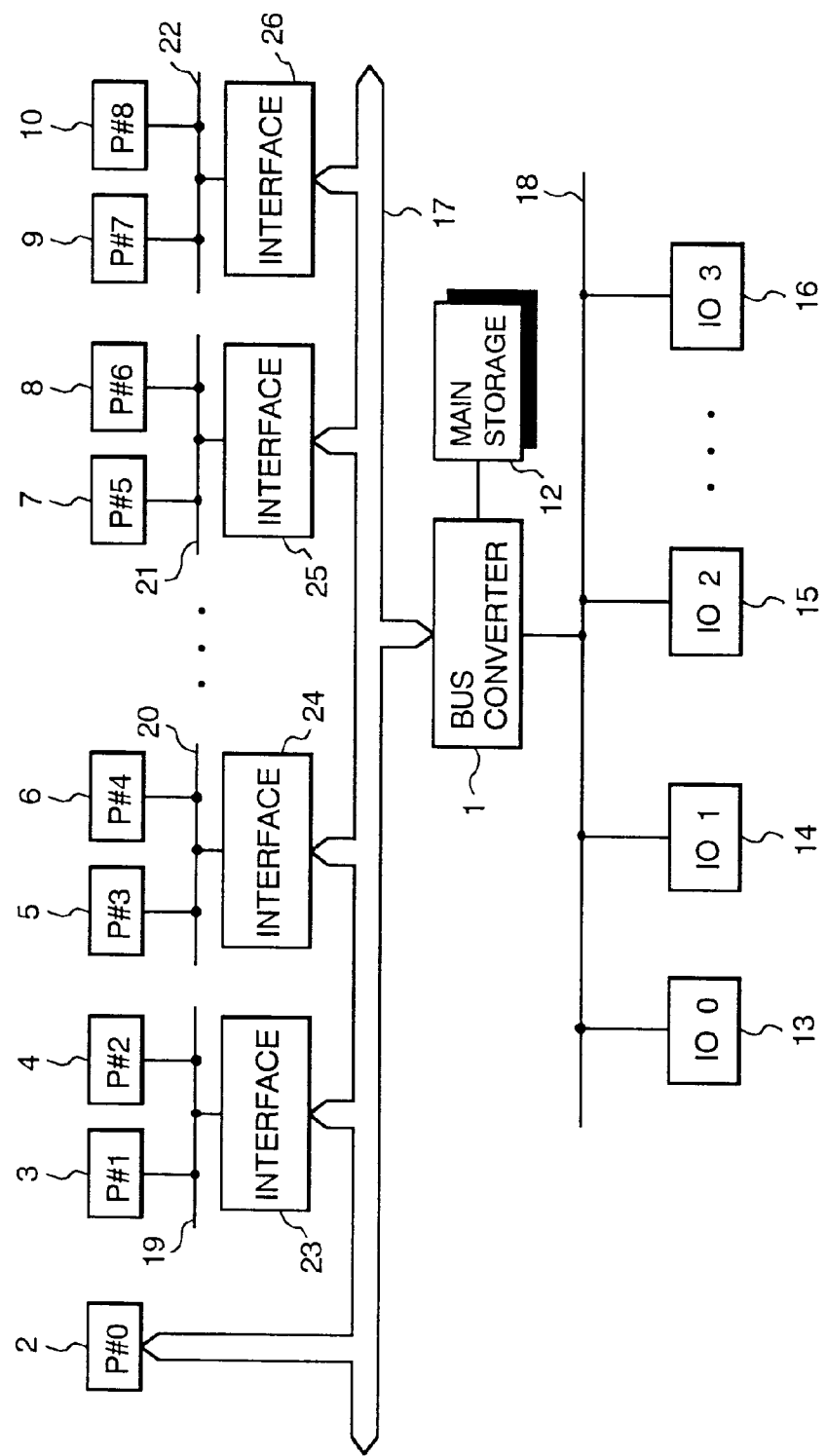
FIG. 9 is a block diagram showing another configuration example of an embodiment of the present invention.

In the aforementioned embodiment, a case that the main storage 12 is structured so as to be connected to the system bus 17 via the memory controller 11 is described. However, as shown in FIG. 9, when the bus converter 1 and the main storage 12 are directly connected to each other, that is, even when the memory controller 11 controlling the main storage 12 is contained in the bus converter 1, if a module connected to the system bus 17 notifies the system bus arbiter 112 of whether the access destination is the main storage or the IO device when it requests a bus access, the system bus arbiter 112 can execute access to the main storage on a priority basis, so that the same good results as those of the aforementioned embodiment can be obtained.

A case that the protocol of the system bus has a retry protocol will be considered hereunder. Retry protocol indicates an operation that when the slave side cannot accept transfer, the master side transfers necessary information again after a predetermined time. Namely, the slave side notifies the master side of that it cannot accept transfer via the signal line first. The master side receiving this notification opens the bus right once when it receives the notification with the bus right held without waiting for acceptance of transfer and passes the bus right to another bus master. After a predetermined time elapses, the master side obtains a bus access again and transfers necessary data again.

When this retry protocol is used, the problem to be solved by the present invention can be solved a little. Namely, even if a certain bus master executes PIO access when the PIO buffer is in the unacceptable state, the bus access can be transferred to another bus master if the bus converter issues a retry request, so that the access operation of a bus master attempting to execute PIO access will not be made wait with another transfer stopped until the PIO buffer enters the acceptable state. However, for example, assuming the retry interval to be 3 cycles, an inevitable problem arises that an unnecessary transfer cycle (a cycle for receiving a retry request again) not relating to transfer is generated at least once in 4 cycles until the PIO buffer enters the acceptable state and the bus access efficiency lowers.

Therefore, the use of such a control method in the present invention can prevent an occurrence of an unnecessary transfer cycle (a cycle for receiving a retry request again) not directly relating to data transfer on the bus and further can improve the bus access efficiency. Therefore, even if the system bus has a retry protocol, the use of this control method in the present invention can improve the bus access efficiency.

Next, a configuration example of the system bus arbiter of the present invention will be described.

As described above, FIG. 10 shows an example thereof and the priority order is predetermined such as BREQ0, BREQ1, BREQ2, BREQ3, BREQ4, BREQ5, and BREQ6 in the descending order. When these bus access request signals (BREQ0 to BREQ6) 702 to 708 are 1, it means that there is a request for bus access.

When a certain bus master outputs a bus right request signal, it notifies the system bus arbiter 112 of whether the access after the bus right is obtained is memory access or IO access via the signal lines 709 to 715 at the same time.

When the signal lines 709 to 715 are 1, it means memory access and when they are 0, it means PIO access.

In this case, the system bus arbiter 112 watches a control signal (130) indicating whether the TO access buffer installed in the system can accept IO access or not. When the control signal 130 is 1, it indicates the access inacceptable state and when the control signal 130 is 0, it indicates the access acceptable state.

According to these signal states, the following control is executed by using the logical circuits 723 to 729 comprising an AND gate and an OR gate.

Firstly, when the access request destination of a certain bus master is the memory, a bus access is granted to the bus master unless memory access is requested from a bus master of higher priority order than the bus master.

If access from a bus master of higher priority order than the bus master performing memory access is only IO access, control of granting a bus access to the bus master executing memory access only when the IO access buffer is in the full state and the access inacceptable state is executed.

The operation of the circuit shown in FIG. 10 will be explained concretely hereunder. For simplicity of explanation, when the BREQ and BGTANT signals are 1 in this circuit, the operation is explained on the assumption that they are asserted (true). Therefore, it is necessary to note that they are expressed differently from the active blow shown in FIGS. 6 and 7.

To make understanding easy, a case that BREQ3 is asserted and a memory access request is issued is supposed. In this case, BREQ3 (705) is 1 and M/I3 (712) is also 1.

Therefore, output 1 of the AND gate (an input signal is positive logic) above the AND.OR gate 726 is transmitted to the AND gate 732 via the OR gate under the AND.OR gate 726. If there is no bus access request (BREQ0, BREQ1, BREQ2) from a module of higher priority order than the self module, a bus right grant signal is outputted via the AND gate 732 and the AND gate 739 according to the timing specified by the timing controller 701 (BGRANT3 becomes 1). If a bus access request (BREQ0, BREQ1, BREQ2) is generated from a module of higher priority order than the self module, one of the outputs of the AND.OR gates 723, 724, and 725 becomes 1 and the logical value is inverted and inputted into the AND gate 732, so that the output of the AND.OR gate 726 is masked and a bus access grant signal is outputted (BGRANT3 is kept at 0).

When a bus access request signal from a module of higher priority order than the self module is PIO access and the PIO access buffer is in the access inacceptable state, the output of the AND gate under the AND.OR gates 723, 724, and 725 becomes 0, that is, the outputs of 723, 724, and 725 become 0, so that the output of the AND gate 732 is not masked and hence the memory access by BREQ3 is given priority.

On the other hand, a case that a request for PIO access by BREQ3 is issued will be considered.

In this case, BREQ3 (705) is 1 and M/I3 (712) is 0. Therefore, when the control signal 130 is 0, output 1 of the AND gate (input signals 712 and 130 are negative logic) under the AND.OR gate 726 is transmitted to the AND gate 732 via the OR gate under the AND.OR gate 726. If there is no bus access request (BREQ0, BREQ1, BREQ2) from a module of higher priority order than the self module, a bus right grant signal is outputted via the AND gate 732 and the AND gate 739 according to the timing specified by the timing controller 701 (BGRANT3 becomes 1). When the control signal 130 is 1, that is, the PIO access buffer is in the access inacceptable state, the output of the AND gate (input signals 712 and 130 are negative logic) under the AND.OR gate 726 becomes 0, so that no bus access grant signal is outputted. Furthermore, when a bus access request (BREQ4, BREQ5, BREQ6) for memory access is issued from a module of lower priority order than the self module, signals masking them (outputs of the AND.OR gate 726 which are inverted and inputted into the AND gates 733, 734, and 735) also become 0, so that memory access from a low priority module can be given priority.

FIG. 11 shows a list of states of arbitration operation in this embodiment.

In the drawing, the transverse axis indicates the kind of bus access right request of a certain bus master (self module), that is, the access destination. Concretely, it indicates "memory access" when the access destination is the memory (main storage) and "IO access" when the access destination is the IO device.

The ordinate axis indicates various states of bus access requests from other modules. They are broadly divided into a case of modules of higher priority order than the priority order of the self module and a case of modules of lower priority order. Furthermore, each case is classified into "memory access request", "IO access request", and "memory access request and IO access request" according to the access state of other modules. Furthermore, other modules are classified according to the buffer state. "Buffer full" indicates that the system IO access buffer is in the full state and the access inacceptable state and "buffer OK" indicates that the IO access buffer is in the empty state and the PIO access acceptable state.

Each "o mark" shown in the drawing indicates that a bus access is granted, and each "x mark" indicates that no bus access is granted and the access operation is made wait (namely, a bus access is granted to another module).

As an actual example, for example, a case that a memory access request is issued from the aforementioned BREQ3 will be considered. In this case, the self module is the module outputting BREQ3. For example, when there is a "memory access request" from BREQ0 of higher priority order, a bus access is granted to BREQ0 independently of whether the PIO access buffer is in the acceptable or inacceptable state and it is expressed by the "x marks" in the first and second rows. It is expressed by the "x mark" in the fourth row on the left that when "IO access requests" from BREQ0 of higher priority order compete each other and the PIO access buffer is in the acceptable state (buffer OK), a bus access is granted to BREQ0 and it is expressed by the "o mark" in the third row on the left that when the PIO access buffer is in the inacceptable state (buffer full), a bus access right is granted to BREQ3.

Figure 12:
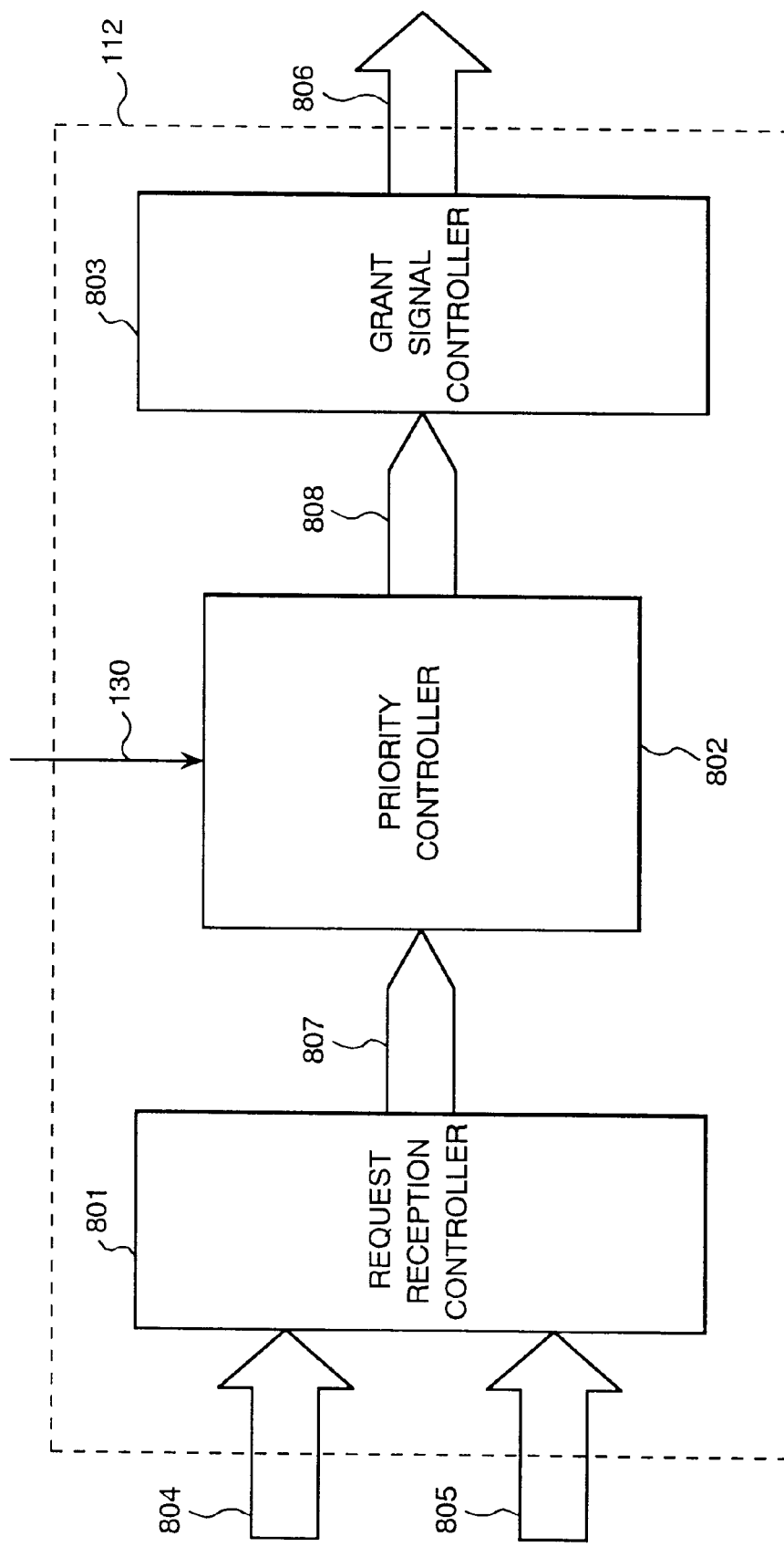
FIG. 12 is a block diagram showing the constitution of a system bus arbiter in the embodiment of the present invention.

The circuit constitution shown in FIG. 10 is only an example for realizing a system bus arbiter and the components necessary to realize the system bus arbiter of the present invention are shown in FIG. 12.

In FIG. 12, numeral 801 indicates a request controller for receiving a bus access request signal 804 and an access destination information signal 805, 802 a priority controller for deciding a bus master to which a bus access is granted by referring to the predetermined priority and IO access buffer storage information (130), and 803 a grant signal controller for controlling the operation for granting a bus access and granting a bus access grant signal 806 to one of the bus masters. Numeral 807 indicates a control signal transmitted between the request reception controller 801 and the priority controller 802 and 808 a control signal transmitted between the priority controller 802 and the grant signal controller 803.

The bus access request signal 804 corresponds to 205, 208, and 211 shown in FIG. 4 and 702 to 708 shown in FIG. 10 and the bus access grant signal 806 corresponds to 206, 209, and 212 shown in FIG. 4 and 716 to 722 shown in FIG. 10. Furthermore, the access destination information signal 805 corresponds to 207, 210, and 213 shown in FIG. 4 and 709 to 715 shown in FIG. 10. The control signal 130 transmitting the empty state of the PIO access buffer is common to FIGS. 3, 10, and 12.

A conventional system bus arbiter comprises the request controller 801 receiving the bus right request signal 804 and the grant signal controller 803 for giving the bus right grant signal 806 to one bus master.

On the other hand, the present invention is characterized in that it is structured so as to input the access destination information signal 805 to the request controller 801 and input the control signal 130 transmitting the empty state of the IO access buffer (information indicating whether the buffer is in the access acceptable or inacceptable state) installed in the system to the priority controller 802 and the priority controller 802 has a function for deciding a bus master to which a bus access is granted by referring to information such as the bus right request signal 804, the access destination information signal 805, the control signal 130, and the predetermined priority.

Namely, the control operation performed by the priority controller 802 decides a bus master to which a bus access is granted in view of the access destination information signal 805 and the control signal 130 transmitting the empty state of the IO access buffer of the system (whether the buffer is in the access acceptable or inacceptable state).

As mentioned above, according to the present invention, in a system in which a high-speed system bus and an IO bus having a lower speed than that of the system bus are connected to each other via a bus adapter, the access speed can be prevented from lowering due to an effect of the performance of the IO bus on main storage access and inter-processor communication.

Furthermore, when a retry protocol is supported, retry transfer information generated on the bus can be reduced, so that the bus access efficiency is improved.

As mentioned above, according to the present invention, high-speed information transfer on the bus can be executed on a priority basis, so that high-speed information transfer can be prevented from obstruction by lower-speed information transfer.

In particular, in a system in which a system bus and an I/O bus having a lower speed than that of the system bus are connected to each other, storage access and inter-processor communication by the system bus are not affected by information transfer using the I/O bus and the bus access efficiency can be prevented from lowering.

Furthermore, when a retry protocol is supported, retry transfer information generated on the bus can be reduced, so that the bus access efficiency is improved.

What is claim is:

1. An information processing system comprising:

a first bus;

signal transmission means;

a second bus operating under a communication protocol different from that of said first bus;

a plurality of modules connected to one of said first and second buses;

a predetermined one of said plurality of modules being a bus conversion means for performing at least protocol conversion of information between said first and second buses;

a bus arbiter, in said bus conversion means, for arbitrating a bus access request issued from a module working as a bus master among said plurality of modules; and a buffer, in said bus conversion means, for storing up to a predetermined amount of data specifying an access operation from said bus master when the access destination of said access operation is said bus conversion means, wherein at least two of said plurality of modules connected to said first bus are operating as bus masters having a function for outputting access destination information, through said signal transmission means, for identifying said bus conversion means as an object of said access operation; and said bus arbiter decides whether or not to give bus access to one of said bus masters issuing a bus access request by referring to said access destination information and the amount of data stored in said buffer.

2. An information processing system according to claim 1, wherein when said predetermined amount of information is fully stored in said buffer and a bus access request is issued from at least two bus masters, and when said bus arbiter refers to said access destination information outputted by one of said bus masters issuing said bus access request and judges that the access destination is not said bus conversion means, said bus arbiter gives bus access to the bus master of the highest priority order among the bus masters for which the access destination is other than said bus conversion means; and on the other hand, when said bus arbiter judges that the access destination of one of said bus masters is said bus conversion means, said bus arbiter gives bus access to the bus master of the highest priority order except said bus conversion means.

3. An information processing system comprising:

a first bus;

signal transmission means;

a plurality of modules connected to said first bus, one of said modules being at least one processor which becomes a bus master and has a memory for storing a priority order for giving bus access and/or a processor interface to which at least one processor is connected, and a memory interface connected to a storage;

a second bus operating under a communication protocol different from that of said first bus;

at least one I/O device as one of a plurality of modules connected to said second bus;

a bus conversion device for performing at least a protocol conversion of information between said first and second buses;

a bus arbiter, in said bus conversion device, for arbitrating bus access requests issued from a bus master among said plurality of modules; and a buffer, in said bus conversion device, for storing data specifying an access operation up to a predetermined amount when the access destination of said bus master is one of said at least one I/O device, wherein said bus master outputs access destination information, through said signal transmission means, for identifying said bus conversion device as an object of said access operation, and when said predetermined amount of information is fully stored in said buffer, and said at least one processor and said processor interface issue a bus access request as a bus master, said bus arbiter refers to said access destination information outputted by said bus master, and when the access destination is not one of said at least one I/O device, said bus arbiter gives bus access to the bus master of the highest priority order when the access destination is said memory interface; and on the other hand, when the access destination is one of said at least one I/O device, said bus arbiter gives bus access to the bus master of the highest priority order among bus masters performing an access operation to said memory interface.

4. An information processing system according to claim 1, wherein said system contains said bus arbiter and said buffer in said bus conversion means on the same chip.

5. An information processing system according to claim 3, wherein when a processor becomes a bus master, said system has a function for outputting access destination information so as to set one of the other processors as a bus slave.

6. A bus arbiter, in one module of a plurality of modules connected to a bus, for arbitrating a bus access, comprising:

a signal input device for receiving a signal indicating a plurality of bus access request signals from modules operating as bus masters, access destination information sent through a signal transmission means, corresponding to each said bus access request signal, and a signal indicating whether a buffer in said one module fully stores a predetermined amount of information of access data for predetermined access destinations; and a processing device for performing a process of giving bus access to one of said modules operating as bus masters by referring to said received signal.

* * * * *